United States Patent Office 3,166,586
Patented Jan. 19, 1965

3,166,586
O-ACETYL THYMOTIC ACID ANHYDRIDE AND PREPARATION THEREOF
Piero Maria Carrara, 36 Corso Monforte, Milan, Italy
No Drawing. Filed July 24, 1964, Ser. No. 385,064
3 Claims. (Cl. 260—479)

Thymotic acid, or 2-hydroxy-3-isopropyl-6-methylbenzoic acid has been long known. It can be prepared according to the indications in literature, by a modification of Kolbe's synthesis; compare e.g. Gazz. Chim. Ital. 39, 325 (1911) or U.S. Patent No. 2,824,892 dated February 25, 1958.

Various authors attribute to thymotic acid properties generally similar to those of salicylic acid; more particularly it is disclosed as having an antipyretic and antiseptic activity. Recently its analgesic activity was emphasized. However, it was likewise ascertained that thymotic acid is of a considerably higher toxicity than salicylic acid and its derivatives.

It has now been found in the course of investigations which lead to this invention that thymotic acid also possesses anti-edema and anti-granulous activities decidedly higher than those of preparations known heretofore, employed in the therapy of rheumatic diseases, such as salicylic and butazolidine preparations. It is true that, in respect to antigranulous activity, salicylic and butazolidine preparations excel, the weight required being the same as with cortisone preparations, but it was also found that the latter are practically analgesically inefficient and are moreover objectionable in various respects in that they detrimentally affect the hydrosaline balance of the human individual.

More particularly, this invention provides the O-acetyl thymotic acid anhydride (AAT) of the structural formula:

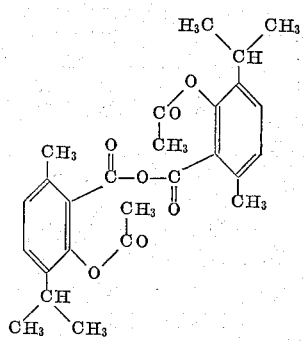

This anhydride is in the form of minute white crystals, the melting point of which is 103–104° C. It is highly soluble in acetone, ethyl acetate, sulphuric ether, chloroform, benzene, and dioxane, and can be crystallized from petroleum ether and aliphatic alcohols, while it is practically water-soluble.

The LD 50 of the anhydride of O-acetyl thymotic acid, which was experimented on rats by endoperitoneal administration, was found to exceed 1500 mg./kg., an extraordinarily high value as compared with 500 mg./kg. of aspirin or 160 mg./kg. of sodium thymotate or even of the 175 mg./kg. of choline thymotate.

The following table summarizes in succinct and conventional manner the activities of the anhydride of O-acetyl thymotic acid:

| | Analgesic activity | Antirheumatic activity | |
|---|---|---|---|
| | | Anti-edema | Anti-granuloma |
| AAT | Reliable | Reliable | Reliable. |
| Acetylsalicyclic acid | Significant, apparently not reliable. | Significant, apparently not reliable. | Significant, apparently not reliable. |
| Diphenylbutazone | Significant, apparently not reliable. | Quite reliable | Significant, apparently not reliable. |
| Prednisolone | Nil | Significant, apparently not reliable. | Reliable. |

It is a primary object of this invention to provide novel compounds of thymotic acid, which possess all the advantages of the above-mentioned preparations and are exempt from their drawbacks and are of decidedly low toxicity so that they can be administered, where necessary, in relatively high doses.

The above novel compounds comprise the O-acyl thymotic acid anhydrides of the general formula:

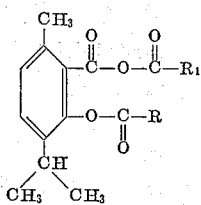

wherein R is a linear or branched chain aliphatic radical having four carbon atoms at the utmost, or a substituted or non-substituted aralkyl or phenyl, and wherein $R_1$ is a linear or branched chain aliphatic radical having four carbon atoms at the utmost, or a substituted or non-substituted phenyl.

The preparation of anhydrides according to this invention necessitates a special operational cycle which is not disclosed or suggested by the literature. More particularly, the reaction conditions of the various reactants should be predetermined and adjusted to obtain first the anhydride of thymotic acid which is successively acylated to yield the O-acyl-thymotic acid anhydrides.

The reverse operation, consisting in acylating thymotic acid to —O-acyl thymotic acid and converting the latter to its anhydride in accordance with methods known in the art, does not lead to any formation of the above-mentioned O-acyl thymotic acid anhydride.

So, e.g., in order to obtain AAT, thymotic acid is converted to its corresponding anhydride by reaction with acetic anhydride. If desired, the two reactants can be admixed with an anhydrous solvent, such as benzene. However, in order to secure a satisfactory output it is important to provide excess acetic anhydride, i.e., a proportion of at least 5 parts by weight to 1 part thymotic acid. The optimum range is 5–10 parts by weight.

The mixture of the two reactants is reflux-reacted at a temperature ranging between 100° and 150° C. during a period ranging between 1 and 4 hours which can in any case be experimentally determined to establish its correct value. The resulting product contains the anhydride of thymotic acid which according to this invention shall now be acylated. For this purpose unreacted acetic anhydride is first evaporated by operating at atmospheric pressure or subatmospheric pressure. The residue is reacted with a large excess of glacial acetic acid, by a proportion of at least 3 parts by weight to 1 part of the residue at a temperature ranging between 70° and 80° C., whereupon the acetic solution is cooled to room temperature. AAT is separated by dilution of the acetic solution with water. This dilution should be carried out with special care. First of all, the volume of the dilution water should not exceed the volume of the acetic solution. Secondly, dilution should be carried out gradually, while constantly stirring. Under these conditions, the precipitation of AAT starts and is substantially complete after about 24 hours standing.

It will be obvious that the invention covers acylating with other acylating agents, such as with the chloride of the acid to be introduced into the molecule of the thymotic acid, such as benzoyl chloride, cinnamoyl chloride and the like. The respective processes will be obvious from the folowing specific examples.

EXAMPLE 1

100 g. thymotic acid are suspended in 600 g. acetic anhydride diluted with 1 liter anhydrous benzene. The resulting mixture is heated and gently reflux-boiled, the temperature being gradually raised to 130–150° C.

After about 3 hours the unreacted acetic anhydride is distilled in vacuum, the residue being dissolved at 70–80° C. in 400 ml. glacial acetic acid. The acetic solution is cooled to room temperature and slowly admixed with 100 ml. water while vigorously stirring. This starts the separation of a white precipitate. 300 ml. water are then added at a quicker rate still vigorously stirring, whereupon the solution is allowed to stand during 24 hours.

The resulting precipitate is collected, washed with 50% acetic acid and recrystallized from ethyl alcohol at 95° C. The result is about 40 g. white crystalline product having a melting point of 103–104° C.

*Analysis.*—Calculated for $C_{26}H_{30}O_7$: C, 68.72%; H, 6.61%; O, 24.67%. Found: C, 68.54%; H, 6.44%; O, 24.81%.

The product is saponified with N/1 caustic potash and is found to be of 99–100% purity, when employing an eqivalent equal to 113.5 (molecular weight 454:4). Titration as anhydride according to D. M. Smith and W. M. D. Bryant (JACS 58, 2452 (1936)) confirms the above-mentioned equivalent corresponding to the molecular weight of AAT.

EXAMPLE 2

100 g. thymotic acid are suspended in 900 g. acetic anhydride. The reaction mixture is maintained during 2 hours at 110–120° C. by reflux. The acetic anhydride is then distilled in vacuum, operation being further carried out as in Example 1.

45 g. AAT are obtained.

EXAMPLE 3

100 g. thymotic acid are reflux-reacted with 300 ml. thionyl chloride. On completion of reaction the unreacted thionyl chloride is eliminated by distillation, the residue being taken with 200 g. acetic anhydride. The solution is then maintained during 2 hours at 110–120° C., whereupon the acetic anhydride is distilled in vacuum.

Further operation is carried out as in Example 1. 60 g. AAT are obtained.

EXAMPLE 4

100 g. thymotic acid are reflux-reacted with 200 g. thionyl chloride. After distillation of the unreacted chloride, the residue is suspended in water and treated by small batches with benxoyl chloride and sodium bicarbonate, in order to maintain the solution near neutrality.

A substance is obtained which, upon recrystallization from ethyl alcohol, is found to be the anhydride of O-benzoyl-thymotic acid.

EXAMPLE 5

100 g. thymotic acid are converted into the bisodium salt in an anhydrous state. This salt is suspended in 500 ml. benzene and admixed with 200 g. thionyl chloride, whereupon the mixture is reflux-reacted during 2 hours.

The cooled mixture is subsequently filtered from the sodium chloride separated during the reaction, the solvent (benzene) being distilled and the residue being treated similarly to that in Example 4, but with cinnamoyl chloride.

A substance is obtained which, upon recrystallization from ethyl alcohol, is found to be the anhydride of O-cinnamoyl thymotic acid.

The utility of O-acetyl-thymotic acid anhydride (AAT) in the treatment of rheumatoid arthritis (osteoarthritis, acute rheumatism, bursitis and lumbago was investigated by clinical studies upon 28 patients. 15 of these patients suffered from rheumatoid arthritis, 5 from osteoarthritis, 3 had an acute rheumatism, 1 a bursitis, and 4 a lumbago. Every patient was subjected to a general examination and a history record on admittance. Liver function tests, urinalysis, hematocrit and erythrocite sedimentation rate determinations were effected in every case prior to the start of the therapy. A general examination was repeted in every case at least once a week after the starting of the therapy. Urinalysis, hematocrit and erythrocite sedimentation rate were determined at two weeks interval and liver function test at least at the end of the treatment trial.

Every patient received 1 tablet orally 3–4 times daily containing 250 mg. AAT each, except for 7 patients selected randomly in the rheumatoid arthritis group, which received the same amount of identical tablets but containing placebo.

*Disease activity*

In the rheumatoid arthritis group this was measured before and after the course of treatment according to the following criteria:

(1) Pain on digital pressure over the affected joint, measured in four grades:
    0—No pain
    1—Slight pain
    2—Severe pain (with wincing)
    3—Pain (with wincing and withdrawal)

(2) Functional capacity as adopted by Duthie and Coll., Ann. Rheum. Dis. 14, 133 (1954):
    1—Normal activity
    2—Moderate restriction
    3—Marked restriction
    4—Confined to chair or bed (3) Erythrocite Sedimentation Rate (mm./hr., Westergren).

(4) Swelling of the affected joint, measured in three grades:
    1—No swelling
    2—Slight swelling
    3—Marked swelling (5) Patient's subjective opinion on his conditions, graded as follows:
    0—Unchanged
    −1—Worse
    −2—Much worse
    +1—Somewhat improved
    +2—Greatly improved (6) Overall results were expressed as follows:
Very good
Good
Moderate
Poor Similar criteria have been followed for the evaluation of the effect of AAT therapy in the miscellaneous group.

Results are summarized in the following tables:

Table I—Grouping of the rheumatoid arthritis patients.
Table II—Clinical particulars of the rheumatoid arthritis group at the start and at the end of course.
Table III—Comparison of AAT and placebo effects in the rheumatoid arthritis group.
Table IV—Grouping and results in the miscellaneous group.
Table V—Overall results of AAT therapy related to the different diseases.

*Toxicity*

The administration of AAT was well tolerated by almost all of the 21 patients who received the drug.

Side effects appeared very seldom and in no case discontinuation of the course was necessary.

In no case were changes detected at the urinalysis, hematocrit and liver function tests determination. In most cases stool examination was effected during and at the end of the course for the detection of gastrointestinal bleeding but the benzidine reaction was always negative.

The few cases of side effects are recorded in Tables I and IV.

From these tests it is concluded that:

(1) The oral administration of 750–1000 mg. daily of AAT for periods ranging from 6 to 14 weeks had an appreciably favorable effect on the disease activity of patients suffering from rheumatoid arthritis, osteoarthritis, acute rheumatism, lumbago.

(2) The administration of placebo to a control group of rheumatoid arthritis patients induced favorable effects of a consistently lower degree and in a lower number of cases. This favorable effect of placebo administration has already been evidenced by many clinicians.

(3) The effect of AAT administration seems to be more evident in subjects which received no previous therapy and when the duration of the disease was shorter at the time of the course starting.

(4) Among the symptoms considered, pain and subjective state seem to be the more favorably affected.

(5) The toxicity of the drug appeared to be very low and no major side effects were induced by its administration for periods over to 14 weeks with daily dosages of 750–1000 mg. orally.

(6) In no case were changes detected at urinalysis, hematocrit and liver function tests, nor evidence of gastrointestinal bleeding was reached.

TABLE I

*Grouping of the rheumatoid arthritis patients*

| Case No. | Sex | Age | Duration of disease (years) | Previous treatment | Treatment Drug | Treatment Duration | Overall results | Side effects |
|---|---|---|---|---|---|---|---|---|
| 1 | M | 46 | 4 | None | AAT | 13 weeks | Good | |
| 2 | M | 47 | 6 | Aspirin cortisone chloroquine | AAT | 6 weeks | Poor | Itching. |
| 3 | F | 44 | 3 | Cortisone chloroquine | AAT | 12 weeks | Moderate | |
| 4 | M | 52 | 7 | Cortisone | AAT | 10 weeks | Good | |
| 5 | F | 56 | 8 | Cortisone chloroquine | AAT | 6 weeks | Moderate | Do. |
| 6 | F | 51 | 4 | Aspirin | AAT | 11 weeks | Good | |
| 7 | F | 43 | 2 | None | AAT | 10 weeks | Very good | |
| 8 | M | 57 | 5 | Chloroquine | AAT | 14 weeks | Good | |
| 9 | M | 52 | 5 | Cortisone aspirin | Placebo | 6 weeks | Poor | |
| 10 | F | 41 | 3 | None | do | 8 weeks | Good | |
| 11 | F | 47 | 6 | Cortisone chloroquine | do | 6 weeks | Poor | |
| 12 | F | 44 | 4 | Cortisone | do | 4 weeks | do | |
| 13 | F | 59 | 9 | Cortisone chloroquine aspirin | do | 6 weeks | do | |
| 14 | M | 60 | 8 | Cortisone | do | 8 weeks | Moderate | Do. |
| 15 | M | 43 | 2 | do | do | 6 weeks | Poor | |

TABLE II

*Clinical particulars of the rheumatoid arthritis group at the start and at the end of course*

| Case No. | Pain | Functional capacity | Swelling | Erythrocyte Sedimentation Rate | Subjective |
|---|---|---|---|---|---|
| 1 | 2-0 | 2-1 | 1-0 | 27-21 | +2 |
| 2 | 2-1 | 2-2 | 1-1 | 25-26 | 0 |
| 3 | 3-1 | 1-1 | 2-1 | 33-28 | +1 |
| 4 | 2-0 | 3-1 | 1-0 | 25-18 | +2 |
| 5 | 4-1 | 2-2 | 0-0 | 24-22 | +1 |
| 6 | 3-0 | 2-1 | 1-0 | 31-26 | +2 |
| 7 | 4-0 | 1-0 | 2-0 | 32-24 | +2 |
| 8 | 2-0 | 1-0 | 0-0 | 23-21 | +1 |
| 9 | 3-3 | 1-1 | 1-0 | 27-25 | −0 |
| 10 | 2-0 | 1-1 | 1-0 | 32-31 | +1 |
| 11 | 2-3 | 2-1 | 0-0 | 23-21 | −1 |
| 12 | 2-2 | 1-1 | 1-1 | 27-25 | 0 |
| 13 | 3-2 | 2-2 | 1-1 | 22-22 | −1 |
| 14 | 1-0 | 2-1 | 1-0 | 26-28 | +1 |
| 15 | 2-2 | 1-1 | 2-2 | 33-34 | 0 |

TABLE III

*Compaison of AAT and placebo effects in the rheumatoid arthritis group*

| | | Number of cases | | |
|---|---|---|---|---|
| | | Improved | Unchanged | Worsened |
| Plain | AAT | 8 | | |
| | Placebo | 3 | 3 | 1 |
| Function | AAT | 5 | 3 | |
| | Placebo | 1 | 5 | |
| Swelling | AAT | 5 | 3 | |
| | Placebo | 3 | 4 | |
| ESR | AAT | 5 | 3 | |
| | Placebo | 1 | 6 | |
| Subjective | AAT | 7 | 1 | |
| | Placebo | 2 | 3 | 2 |
| Overall | AAT | 7 | 1 | |
| | Placebo | 2 | 4 | 1 |

TABLE IV
Grouping and results in the miscellaneous group

| Case No. | Age | Sex | Diagnosis | Therapy | | Result | Side effects |
|---|---|---|---|---|---|---|---|
| | | | | Drug | Duration | | |
| 1 | 16 | M | Acute rheumatism | AAT | 6 weeks | Good | |
| 2 | 49 | M | Osteoarthritis | AAT | 10 weeks | Moderate | |
| 3 | 47 | F | ----do | AAT | 8 weeks | Poor | |
| 4 | 42 | M | Lumbago | AAT | 6 weeks | Good | |
| 5 | 27 | F | Acute rheumatism | AAT | 8 weeks | Poor | |
| 6 | 58 | F | Lumbago | AAT | 6 weeks | Very good | |
| 7 | 62 | F | Osteoarthritis | AAT | 12 weeks | Good | Dizziness. |
| 8 | 37 | M | Bursitis | AAT | 6 weeks | Poor | |
| 9 | 57 | M | Osteoarthritis | AAT | 8 weeks | Moderate | |
| 10 | 31 | M | Acute rheumatism | AAT | 6 weeks | ----do | |
| 11 | 55 | M | Osteoarthrisis | AAT | 10 weeks | Good | |
| 12 | 48 | M | Lumbago | AAT | 6 weeks | Moderate | Itching. |
| 13 | 57 | F | ----do | AAT | 10 weeks | Good | |

TABLE V
Overall results of AAT therapy related to the different diseases

| | Number of Cases | |
|---|---|---|
| | Improved | Unchanged |
| Rheumatoid arthritis | 6 | 2 |
| Osteoarthritis | 4 | 1 |
| Acute rheumatism | 2 | 1 |
| Lumbago | 4 | |
| Bursitis | | 1 |

This is a continuation-in-part of application Serial No. 142,009, filed October 2, 1961, now abandoned.

What is claimed is:

1. The anhydride of O-acetyl thymotic acid as represented by the following structural formula:

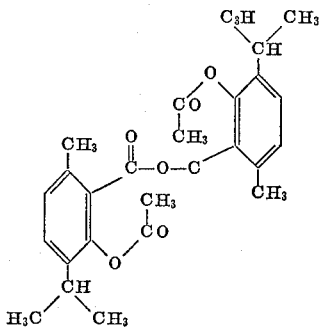

2. The method of preparing the anhydride of O-acetyl thymotic acid, comprising the steps of reflux reacting thymotic acid with an excess of acetic anhydride at a temperature of between 100° and 150° C. for a period of time between 1 and 4 hours, subsequently evaporating from the reaction product the unreacted acetic anhydride, reacting the residue by dissolving said residue in at least three parts of glacial acetic acid per part of said residue at a temperature between about 70° and 80° C., and precipitating the O-acetyl thymotic acid anhydride from the glacial acetic acid solution by dilution of said glacial acetic acid solution with water in a volume not exceeding that of said glacial acetic acid solution, said water being added gradually with constant stirring.

3. The method of claim 2 wherein said thymotic acid is refluxed reacted with at least about five parts by weight of said acetic anhydride per part of thymotic acid.

References Cited by the Examiner
UNITED STATES PATENTS
2,236,125 3/41 Wiezevich _____ 260—480
2,731,492 1/56 Kamlet _____ 260—480

FOREIGN PATENTS
9,898 1897 Great Britain.
478,004 10/51 Canada.

LORRAINE A. WEINBERGER, *Primary Examiner.*